United States Patent [19]

Amano et al.

[11] Patent Number: 4,638,403
[45] Date of Patent: Jan. 20, 1987

[54] GAS-INSULATED SWITCHGEAR APPARATUS

[75] Inventors: Naoki Amano; Hitoshi Kayaba; Takehiro Kikuchi, all of Hitachi, Japan

[73] Assignee: Hitachi, Ltd., Tokyo, Japan

[21] Appl. No.: 618,480

[22] Filed: Jun. 8, 1984

[30] Foreign Application Priority Data

Jun. 15, 1983 [JP] Japan .................. 58-105667

[51] Int. Cl.⁴ ............................. H02B 1/04
[52] U.S. Cl. .................... 361/341; 361/333; 361/335
[58] Field of Search ........... 200/148 D, 148 E, 148 F; 361/332–335, 341, 361, 363

[56] References Cited

U.S. PATENT DOCUMENTS

4,354,220 10/1982 Oishi et al. ................. 361/333
4,503,481 3/1985 Fujiya et al. ................. 361/333

Primary Examiner—A. D. Pellinen
Assistant Examiner—Gregory D. Thompson
Attorney, Agent, or Firm—Antonelli, Terry & Wands

[57] ABSTRACT

A gas-insulated switchgear apparatus is disclosed, in which a bus bar-dividing unit is interposed through main bus bars between feeder units connected to a transmission line or a transformer. The main bus bars are arranged in substantially the same axis. A circuit breaker of vertical type making up the bus bar-dividing unit includes an upper electric path and a lower electric path. The lower electric path is connected to one of the main bus bars while the upper electric path is connected to the other main bus bar at a position displaced axially of the main bus bar opposed to the circuit breaker of vertical type. This construction with the circuit breakers of vertical type arranged on the same axis facilitates maintenance and inspection.

7 Claims, 13 Drawing Figures

GAS-INSULATED SWITCHGEAR APPARATUS

BACKGROUND OF THE INVENTION

The present invention relates to a gas-insulated switchgear apparatus having bus bar dividing units, or more in particular to a gas-insulated switchgear apparatus used as a single bus system and a double bus system.

Generally, a gas-insulated switchgear apparatus is constructed of a unit for dividing bus bars.

This bus bar dividing unit, unlike a feeder unit for connection with a transmission line or a transformer, must be configured with special care. In many cases, even the positions of main bus bars are restricted by the bus bar dividing unit.

BRIEF DESCRIPTION OF THE DRAWING

The background of the present invention and preferred embodiments thereof will be explained below with reference to the drawings, in which.

Figure 1:
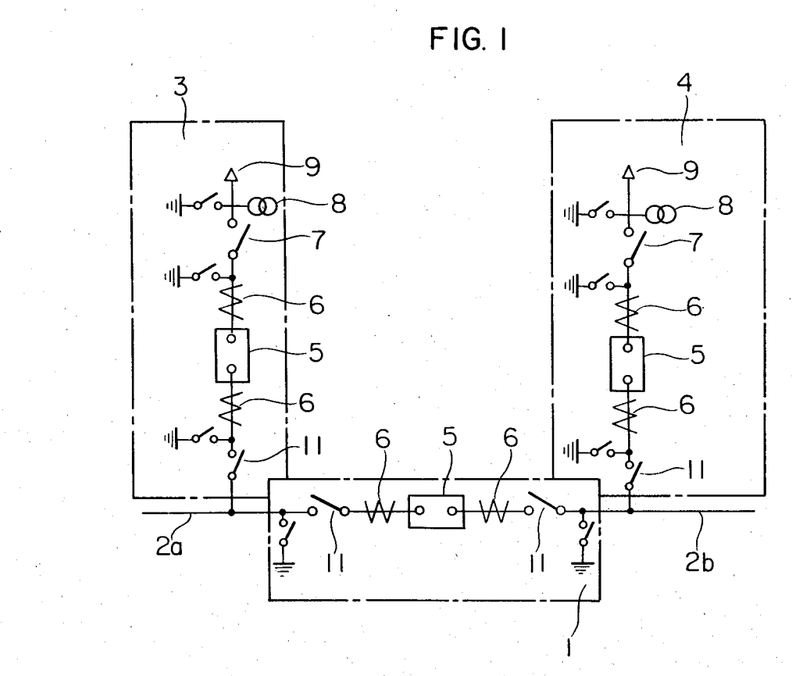
FIG. 1 is an electrical connection diagram showing a gas-insulated switchgear apparatus of single bus bar type having a bus bar dividing unit for explaining the prior art and the present invention.

In FIG. 1, main bus bars 2a, 2b are divided by a bus bar-dividing unit 1 including a circuit breaker 5, current transformers 6 and disconnecting switches 11 thereby to divide a power supply and a load route of a power substation. Generally, the terminals of the circuit breaker 5 of the bus bar-dividing unit 1 are connected to the main bus bars 2a, 2b through the current transformers 6 and the disconnecting switches 11 respectively. The main bus bars 2a and 2b, on the other hand, are connected to two feeder units 3 and 4 respectively each including a circuit breaker 5, disconnecting switches 7, 11, an instrument transformer 8 and a cable head 9.

One of the terminals of the circuit breaker 5 of the feeder units 3, 4 is connected to the main bus bars 2a, 2b through the current transformer 6 and the disconnecting switch 11, and the other terminal thereof is connected to a cable not shown through the current transformer 6, the disconnecting switch 7, the instrument transformer 8 and the cable head 9.

The bus bar-dividing unit 1 having a circuit breaker 5 is inserted between the main bus bars 2a and 2b shown in FIG. 1, so that an accident that may occur in one main bus bar 2a is prevented from affecting the other main bus bar 2b by being interrupted at the circuit breaker 5.

Figure 2:
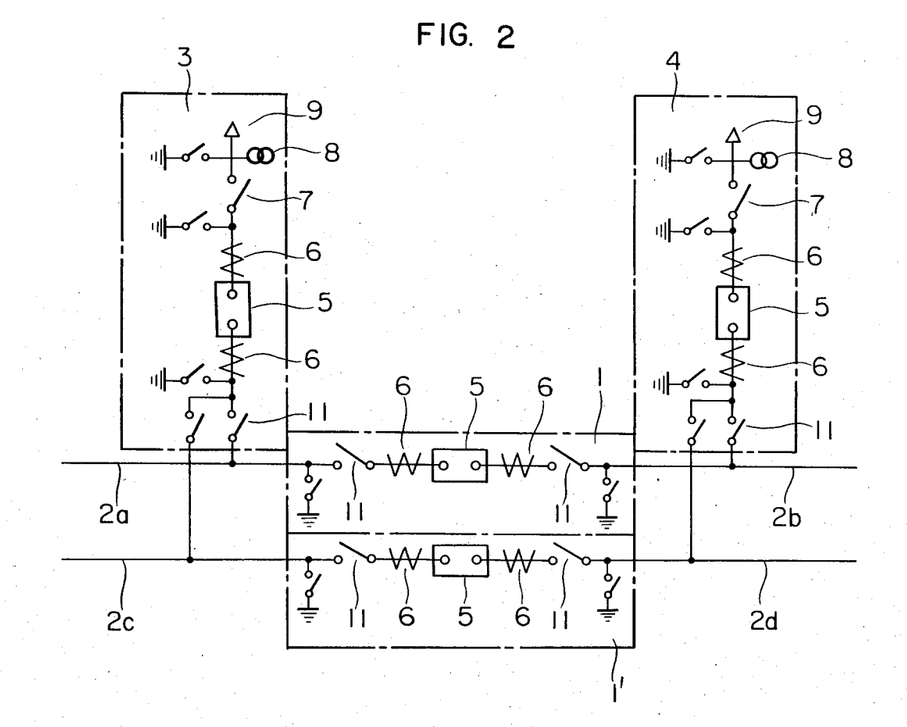
FIG. 2 is an electrical connection diagram showing a gas-insulated switchgear apparatus of double bus bar type having bus bar dividing units for explaining the prior art and the present invention.

In FIG. 2, each of the circuit breakers 5 of the feeder units 3, 4 is connected through a couple of parallel-connected disconnecting switches 11 to the main bus bars 2a, 2c or 2b, 2d respectively. Therefore, a couple of main bus bar-dividing units 1 and 1' are required. Other connections are similar to those of the single bus bar system shown in FIG. 1 and are not shown.

Figure 3:
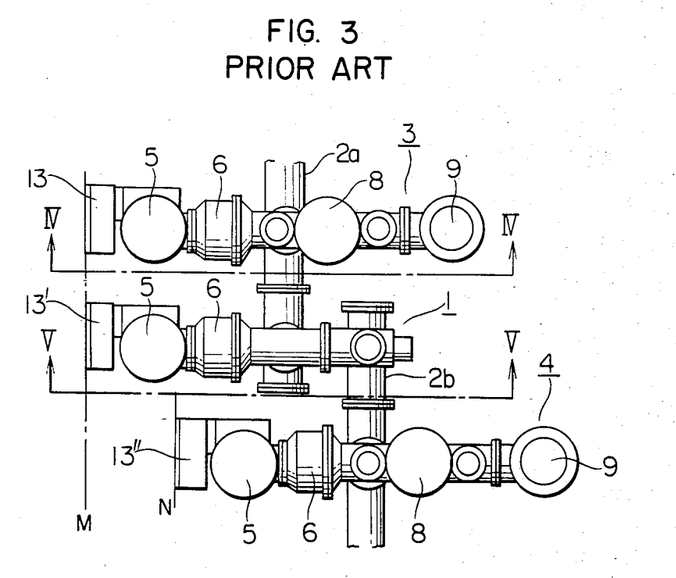
FIG. 3 is a plan view showing a conventional gas-insulated switchgear apparatus.

FIG. 3 is a plan view showing a part of a conventional gas-insulated switchgear apparatus. For the purpose of the bus bar-dividing unit 1, the main bus bars 2a and 2b are arranged in two axes with opposite ends thereof juxtaposed along the axes. The bus bar-dividing unit 1 is provided on both sides thereof with feeder units 3 and 4 each with an end thereof connected to the main bus bars 2a and 2b. The other end each of the feeder units 3 and 4 is connected to a power transmission line and a transformer.

The component elements designated with reference numerals in FIG. 3 are also designated with the same reference numerals in FIGS. 1 and 2 and are contained in respective cases.

Each of the circuit breakers 5 is provided with a local control panel 13, 13', 13" for monitoring the operating conditions of the bus bar-dividing unit 1 and the feeder units 3, 4 and the conditions of the gas sealed therein. These units 1, 3, 4 will be explained below.

Figure 4:
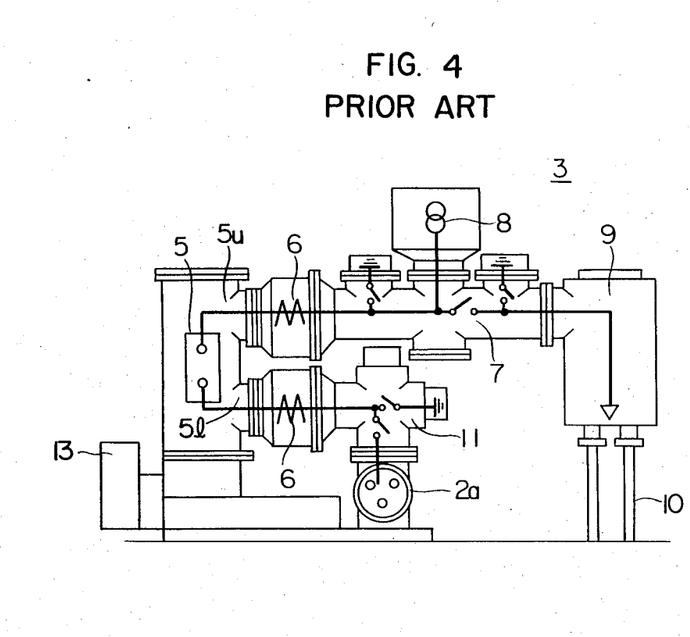
FIG. 4 is a side view taken from IV—IV in FIG. 3.

FIG. 4 shows a construction of the feeder units 3, 4 shown in FIG. 3. The upper path 5u of the circuit breaker 5 of vertical type includes a current transformer 6, a disconnecting switch 7, and an instrument transformer 8, and is connected through insulating leading-out means such as a cable head 9 to the cable 10. In place of the cable 10, a bushing may be used for leading out from a stringing. The lower path 5l of the circuit breaker 5, on the other hand, is connected to the main bus bar 2a or 2b through a current transformer 6 and a disconnecting switch 11.

Figure 5:
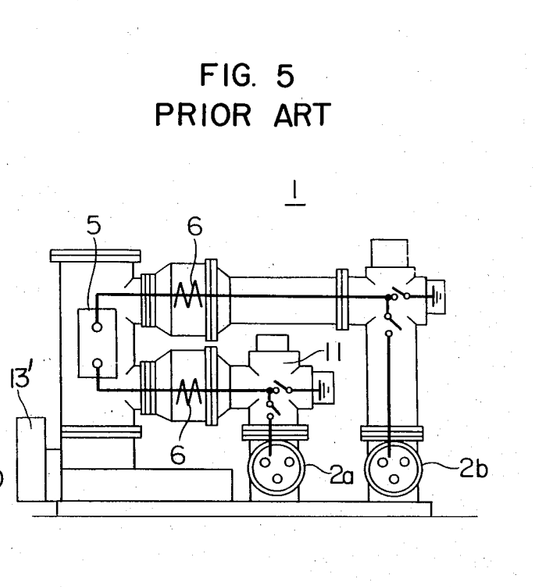
FIG. 5 is a side view taken from V—V in FIG. 3.

FIG. 5 shows a construction of the bus bar-dividing unit 1 of FIG. 3. The bus bar-dividing unit 1 connects the both ends of the circuit breaker 5 to the main bus bars 2a and 2b arranged on different axes. As understood from the comparison with FIG. 4, the arrangement of the main bus bars 2a and 2b on two axes permits many component parts to be identical to each other in construction, thus contributing to a standardization.

As shown in FIG. 3, however, the feeder units 3 and 4 located on the sides of the bus bar-dividing unit 1 have circuit breakers 5 at different positions as indicated by lines M and N. This makes the maintenance and inspection of the circuit breakers 5 inconvenient on the one hand, and undesirably increases the size of the apparatus along the width thereof on the other hand.

Figure 6:
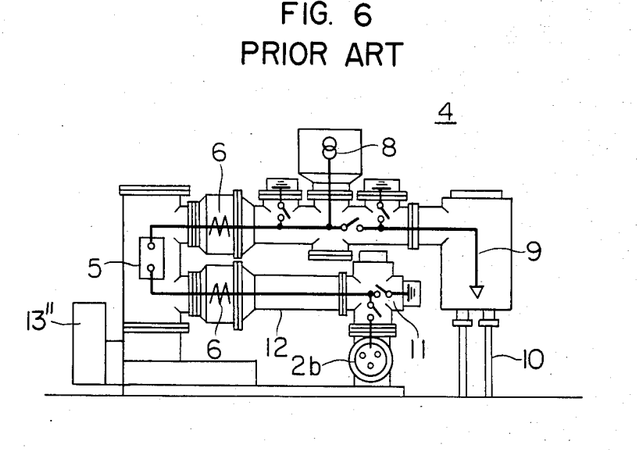
FIG. 6 a side view of another construction corresponding to FIG. 4.

In order to obviate this disadvantage, a method may be to construct the feeder unit 4 in the manner as shown in FIG. 6 to arrange the circuit breakers 5 of the respective units in the straight line M in FIG. 3. The arrangement of FIG. 6, however, in which the circuit breaker 5 and the main bus bar 2b are separated from each other, requires an additional connecting bus bar 12 and therefore is not economical.

SUMMARY OF THE INVENTION

Accordingly, an object of the present invention is to provide a gas-insulated switchgear apparatus comprising a bus bar-dividing unit with a simplified general configuration.

Another object of the present invention is to reduce the installation area of the whole gas-insulated switchgear apparatus.

Still another object of the invention is to facilitate the maintenance and inspection by arranging the units of the gas-insulated switchgear apparatus in alignment.

A further object of the invention is to render uniform the space of the installation margins of the gas-insulated switchgear apparatus.

In order to achieve the above-mentioned objects, according to the present invention, the main bus bars are arranged in a straight line for making up a bus bar-dividing unit.

DESCRIPTION OF THE PREFERRED EMBODIMENTS

Figure 7:
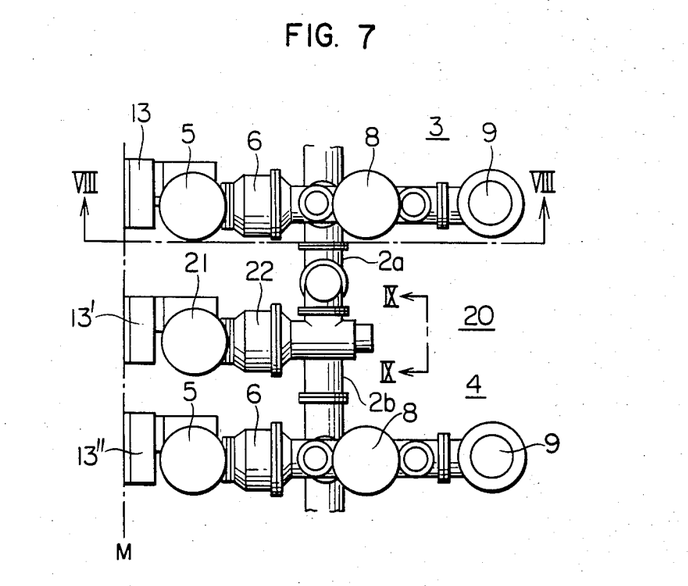
FIG. 7 is a plan view of an embodiment of the gas-insulated switchgear apparatus according to the present invention.

FIG. 7 shows a gas-insulated switchgear apparatus built around a bus bar-dividing unit according to the present invention. As seen from this drawing, main bus bars 2a and 2b divided by a bus bar-dividing unit 20 are arranged in a straight line and thus exhibits an appearance of a single bus bar. Local control panels 13, 13', 13'' mounted on the circuit breakers 5 and 21 are also aligned in a line M, providing an easy access for inspection by a maintenance man.

Figure 8:
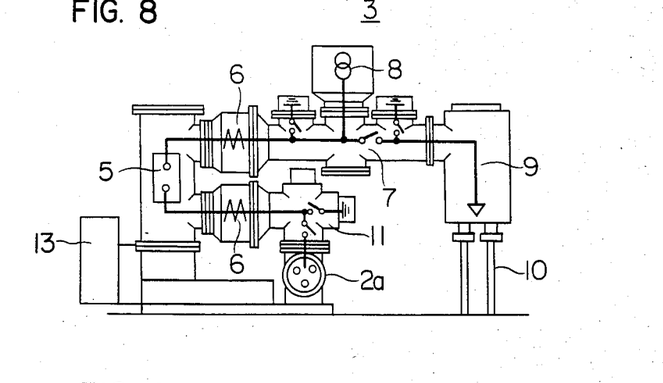
FIG. 8 is a side view taken from VIII—VIII in FIG. 7.

FIG. 8 is a diagram showing a construction of feeder units 3, 4 making up a gas-insulated switchgear apparatus according to the present invention shown in FIG. 7. Since it is constructed in the same way as the feeder units 3, 4 of the conventional gas-insulated switchgear apparatus shown in FIG. 4, explanation thereof will be omitted with the parts thereof designated by the same reference numerals as those in FIG. 4.

Figure 9:
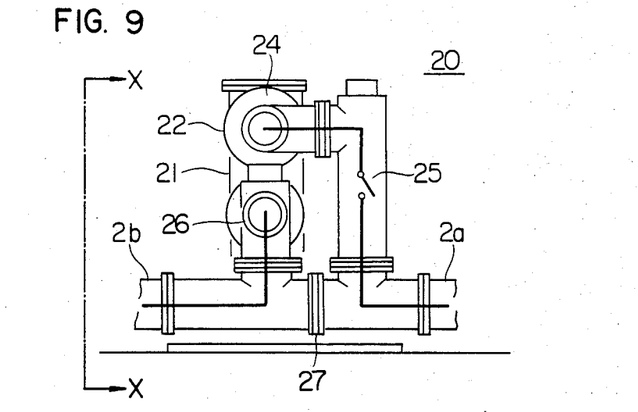
FIG. 9 is a side view taken from IX—IX in FIG. 7.
Figure 10:
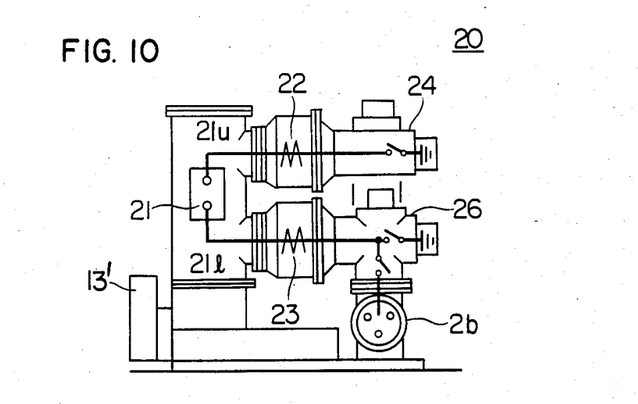
FIG. 10 is a side view taken from X—X in FIG. 9.

FIGS. 9 and 10 show a construction of the bus bardividing unit 1 included in a gas-insulated switchgear apparatus according to the present invention.

The upper path 21u and the lower path 21l of the circuit breaker 21 of vertical type are connected to current transformers 22 and 23 respectively. The current transformer 22 in turn is connected to an L-shaped conductor 24 bent in horizontal direction perpendicular to the axial line thereof. The L-shaped conductor 24 is connected with a disconnecting switch 25 connected to the main bus bar 2a. These cases may be separately or integrally constructed. Preferably, however, the upper path 21u of the circuit breaker 21 is bent in the axial direction of the main bus bar 2a, and the upper path 21u is connected with the main bus bar 2a at a point somewhat displaced axially of the main bus bar 2a from the point of shortest connection between the circuit breaker 21 and the main bus bar 2a as shown in FIG. 9. In other words, the circuit breaker 21 may be connected with the main bus bar 2a at a place displaced from the part opposite to the circuit breaker 21. On the other hand, the lower path 21l is connected to the main bus bar 2b through the disconnecting switch 26 and the like. In the shown example, the lower path 21l and the main bus bar 2b are connected to each other at opposed points of the circuit breaker 21. According to this construction, the main bus bars 2a, 2b approach the connection of the upper and lower paths 21u, 21l, so that the conventionally separated main bus bars 2a and 2b are mechanically coupled by being separated into gas sections by a gas separator including a metal disc or an insulating spacer. In other words, the cases thereof are connected. More details of this construction are shown in FIGS. 11 and 12.

Figure 11:
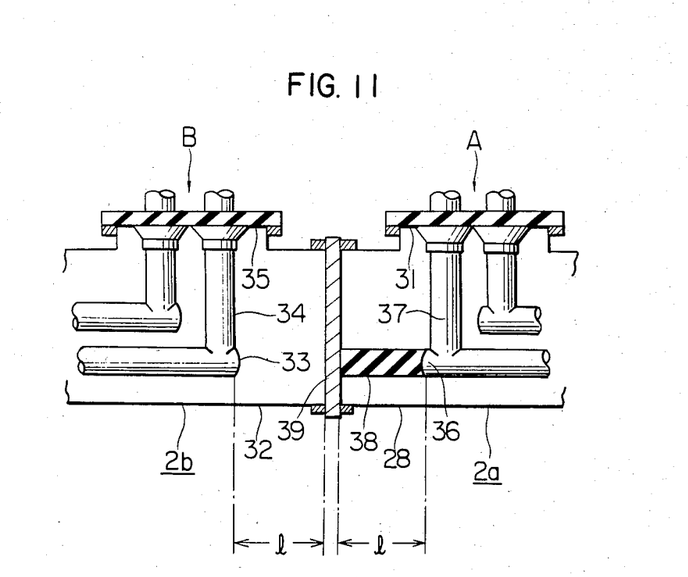
FIG. 11 and FIG. 12 are sectional views of the main bus bar of FIG. 9.
Figure 12:
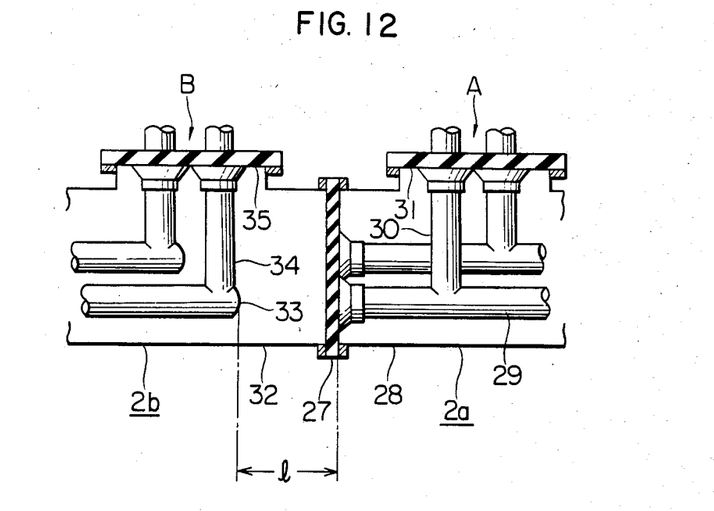

FIGS. 11 and 12 are sectional diagrams of the main bus bars shown in FIG. 9. In FIG. 11, a bus bar conductor 36 in the case 28 of the main bus bar 2a is supported on the metal disc 39 through a post spacer 38. On the other hand, a branch conductor 37 is supported through an insulation spacer 31, and is connected to the upper path 21u of the circuit breaker 21. A bus bar conductor 33 in the case 32 of the main bus bar 2b is separated from the metal disc 39 by a predetermined distance l. This predetermined distance l is sufficient to provide full insulation by the sealed gas.

The bus bar conductor 33 is connected to the lower path 21l of the circuit breaker 21 through an insulation spacer 35 supporting a branch conductor 34. In FIG. 11, the post spacer 38 may be removed to attain lateral symmetry or may be installed on the other main bus bar side 2b.

In FIG. 12, the bus bar conductor 29 in the case 28 of the main bus bar 2a is fixed by the insulation spacer 27. The branch conductor 30 is supported through the insulation spacer 31 and is connected to the upper path 21u of the circuit breaker 21. The bus bar conductor 33 in the case 32 of the main bus bar 2b is disposed by a predetermined distance l from the bus bar conductor 29 supported by the insulation spacer 27 in the same manner as in FIG. 11.

In the example shown in FIG. 12, the main bus bars 2a and 2b are coupled through the insulation spacer 27, and therefore the distance between the connectors A and B of the main bus bar making up a connection of the upper path 21u and the lower path 21l is reduced. The left end of the bus bar conductor 29 may be constructed in the same manner as the right end of the bus bar conductor 33 or the ends of these bus bar conductors may be opposite in construction.

According to another embodiment, in FIG. 9, the mounting angle of the disconnecting switch 26 on the current transformer 23 is rotated by 90 degree, so that the connecting position of the disconnecting switch 26 and the main bus bar is displaced further to the left in the drawing. This example makes it possible to form some space in the opposed portions of the main bus bars 2a and 2b, and therefore the conductors of the main bus bars 2a and 2b can be formed as shown by the bus bar conductor 33 in FIG. 12 with ends of the cases sealed with a metal cover respectively. Since the construction between the disconnecting switch 26 and the main bus bar 2b is complicated in this example, the shown embodiment is more preferable.

Figure 13:
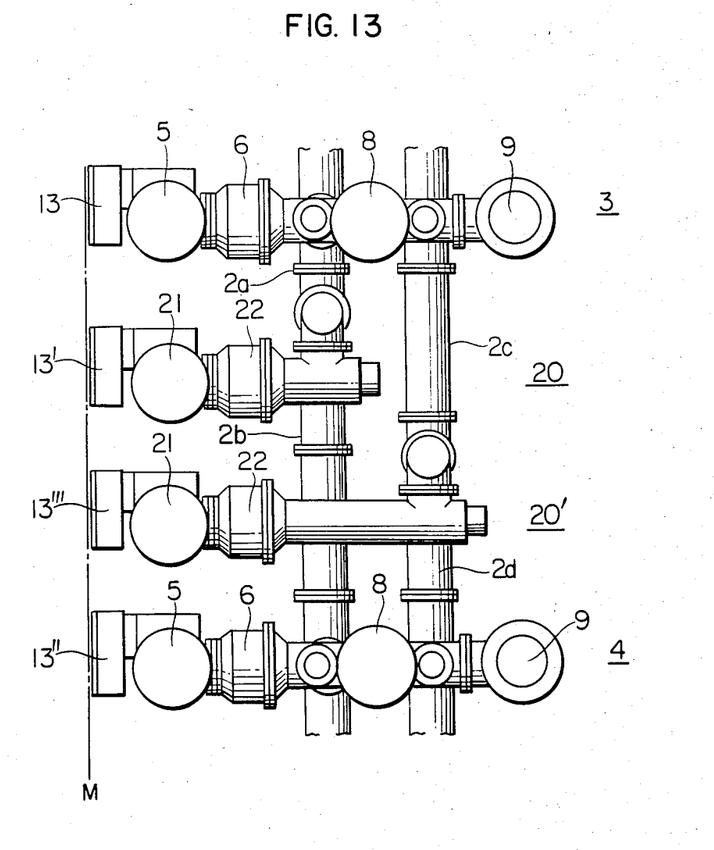
FIG. 13 is a plan view of a gas-insulated switchgear apparatus according to the present invention used as a double bus bar system.

FIG. 13 shows an example involving a double-bus bar system shown in FIG. 2 of the gas-insulated switchgear apparatus according to the present invention. In the double-bus bus bar system, as in the single bus bar system described above, the main bus bars are divided into 2a, 2b and 2c, 2d by the main bus bar-dividing units 20 and 20', and the main bus bar 2a is aligned with the main bus bar 2b, and the main bus bar 2c with 2d. Also, the local control panels 13, 13', 13'', 13''' are arranged in a line on the circuit breakers 5 and 21.

Due to this construction, the present invention exhibits superior effects as described below.

(1) A couple of main bus bars are arranged in a substantially single axial line, and the upper path of the bus bar-dividing unit connected between the main bus bars is connected to the main bus bar at a position displaced along axial direction from the opposed points of the circuit breaker. As a result, the circuit breakers are aligned while at the same time providing the units with a number of common parts to attain standardization.

(2) The upper path is constructed as described above, thereby simplifying the construction of the bus bar-dividing unit.

(3) The local control panels are arranged in a straight line of the circuit breaker thereby to facilitate the maintenance and inspection.

(4) The installation area of the gas-insulated switchgear apparatus is reduced to make a margin space uniform.

(5) The main bus bars are not overlapped but arranged in alignment, so that it is easy to take out main bus bars.

We claim:

1. A gas-insulated switchgear apparatus comprising two main bus bars extending substantially along a common axis and having respective end portions spaced from each other, feeder units connected to said two main bus bars, respectively, and a bus-bar dividing unit including one circuit breaker of vertical type disposed with its vertical axis substantially aligned with the end portion of one of said two main bus bars, when viewed in a direction perpendicular to the common axis of said two main bus bars, a lower electric path directly connecting said one circuit breaker to the end portion of said one of said two main bus bars, and an upper electric path including at least a portion perpendicular to a direction of said common axis and a portion parallel to the direction of said common axis to directly connect said one circuit breaker to the end portion of the other of said two main bus bars so that said two main bus bars are connected through said one circuit breaker.

2. A gas-insulated switchgear apparatus according to claim 1, wherein cases of said main bus bars containing bus bar conductors arranged therein are gas-separated by a gas separator.

3. A gas-insulated switchgear apparatus according to claim 2, wherein said gas separator is made of a metal disc.

4. A gas-insulated switchgear apparatus according to claim 2, wherein said gas separator is made of an insulation spacer.

5. A gas-insulated switchgear apparatus according to claim 3, wherein one of said bus bar conductors arranged in said main bus bars is supported by said metal disc through a post spacer.

6. A gas-insulated switchgear apparatus according to claim 4, wherein one of said bus bar conductors is supported by said insulation spacer.

7. A gas-insulated switchgear apparatus according to claim 3, wherein said bus bar conductors are arranged a predetermined distance away from said metal disc.

* * * * *